United States Patent [19]

Murayama

[11] 4,412,797
[45] Nov. 1, 1983

[54] APPARATUS FOR FORMING A LINER IN A CONTAINER CLOSURE

[75] Inventor: Kashiwa Murayama, Fujisawa, Japan

[73] Assignee: Japan Crown Cork, Co., Ltd., Tokyo, Japan

[21] Appl. No.: 345,915

[22] Filed: Feb. 4, 1982

Related U.S. Application Data

[63] Continuation of Ser. No. 99,031, Nov. 30, 1979, abandoned.

[51] Int. Cl.³ .................... B28B 5/00; B29F 1/10
[52] U.S. Cl. ............................ 425/114; 425/110; 425/126 R; 425/127; 425/809
[58] Field of Search .............. 425/110, 117, 126, 127, 425/128, 809, 114; 264/268, DIG. 67

[56] References Cited

U.S. PATENT DOCUMENTS

| | | | |
|---|---|---|---|
| 1,484,961 | 2/1924 | Peelle | 264/DIG. 67 |
| 3,577,595 | 5/1971 | Smith | 425/809 |
| 3,877,497 | 4/1975 | Busi | 425/809 |
| 4,274,822 | 6/1981 | Tamai et al. | 425/127 |
| 4,293,510 | 10/1981 | George et al. | 425/809 |
| 4,336,011 | 6/1982 | George et al. | 425/809 |

FOREIGN PATENT DOCUMENTS

| | | |
|---|---|---|
| 36-15447 | 5/1961 | Japan . |
| 47-3515 | 5/1972 | Japan . |
| 4940355 | 8/1972 | Japan . |
| 47-46186 | 12/1972 | Japan . |
| 52-110176 | 9/1977 | Japan . |
| 53-65184 | 6/1978 | Japan . |

*Primary Examiner*—Donald E. Czaja
*Assistant Examiner*—W. Thompson
*Attorney, Agent, or Firm*—Wenderoth, Lind & Ponack

[57] ABSTRACT

A method for forming a liner of the desired shape in a container closure, and an apparatus for carrying out this method. The method involves extruding a liner stock in the heated and molten state into an annular shape by an extruder, positioning the annular liner stock at a predetermined location in a closure, and molding the annular liner stock positioned in the closure into the desired shape while it is still in the molten state.

3 Claims, 11 Drawing Figures

APPARATUS FOR FORMING A LINER IN A CONTAINER CLOSURE

This application is a continuation of application Ser. No. 99,031, filed Nov. 30, 1979 now abandoned.

FIELD OF THE INVENTION

This invention relates to a method and an apparatus for forming a liner by feeding a liner stock into a container closure, especially a container closure having a relatively large diameter, and molding the liner stock into the desired shape.

DESCRIPTION OF THE PRIOR ART

It is important to form a liner of the desired shape in a container closure such as crown caps, screw caps or easily openable closures of various types in order to achieve good sealing between the closure and the opening end portion of a container such as bottles and cans.

A conventional method for forming such a liner in a closure container, which is in commercial use, comprises extruding a liner stock in the heated and molten state composed of a thermoplastic resin such as a polyolefin or a vinyl chloride resin into a nearly spherical or cylindrical form from an extruder, feeding it to the center of the central panel portion of the container closure, and then molding the liner stock into the desired shape while it is still in the hot and molten state (see, for example, Japanese Patent Publication No. 15447/61, Japanese Utility Model Publication No. 3515/72, and Japanese Laid-Open Patent Publications Nos. 110176/77 and 65184/78.

The conventional method, however, has important problems that have to be solved. Generally, that part of a container closure which essentially requires the presence of a liner is its peripheral edge portion corresponding to the opening end of a container. Hence, the shape of the essential part of the liner is annular. In the conventional method, however, the liner stock extruded from the extruder is roughly spherical or cylindrical, and such a liner stock is fed to the center of the central panel portion of the closure. This makes it necessary the cause a greater part of the liner stock to flow to the peripheral edge of the container closure when molding the liner stock. It has been found in practice that especially when the container closure is of a relatively large diameter, it is extremely difficult to cause a greater part of the liner material to flow to the peripheral edge of the container closure. When the molten liner stock is to be molded into the desired shape, it is generally necessary to cool a molding tool, etc. Cooling will in turn result in the cooling of the heated and molten liner stock, and thus cause a reduction in its flowability. Even if a greater part of the liner stock can be caused to flow well to the peripheral edge of the closure as desired during the molding process, the flowing of the liner stock tends to result in a radial orientation of the liner stock. Thus, when a load is exerted on the liner during or after mounting the closure on a container after the liner stock has been fully molded into the desired shape and cooled, cracks in a radial form tend to occur in the liner to reduce its function. This is a serious problem. Moreover, even when a greater part of the liner stock can be caused to flow well to the peripheral edge of the closure as desired during the molding process, a considerable amount of the liner stock will still remain at the center of the central panel portion of the closure, and therefore is wasted. This economical problem is also of great concern.

A method was also suggested in the past which comprises molding a liner stock into an annular or wheel-like pre-formed liner, feeding the pre-formed liner into a container closure, heating the pre-formed liner until it is melted, and then molding it into the desired shape (see, for example, Japanese Laid-Open Patent Publications Nos. 46186/72 and 40355/74). This conventional method, however, involves a complicated liner-forming process because it requires additional steps of pre-forming a liner stock into a preformed liner of a certain shape, and of heating the pre-formed liner fed into the container closure before it is molded. In the conventional method, the pre-formed liner which has been formed into the desired shape by cooling is again heated before the molding step, and after the molding step, it is again cooled. This poses another problem that repeated heating and cooling degrade the properties of the resin which constitutes the liner.

SUMMARY OF THE INVENTION

It is a primary object of this invention to provide a novel and improved method and apparatus for forming a liner in a container closure which give a solution to the aforesaid problems associated with the conventional methods.

Our extensive investigations and experiments have led to the discovery that the aforesaid problems with the conventional methods can be satisfactorily solved by extruding a liner stock in the heated and molten state into an annular shape by an extruder, positioning it at a predetermined location in a container closure, and molding the liner material into the desired shape while it is still in the hot and molten state.

According to this method, there is provided a method for forming a liner in a container closure, which comprises extruding a liner stock in the heated and molten state into an annular shape by an extruder, positioning the annular liner stock at a predetermined location in a container closure, and molding the annular liner stock positioned in the closure into the desired shape while it is still in the hot and molten state.

According to the method of this invention, the liner stock in the heated and molten state is extruded into an annular shape and positioned in a predetermined site within the closure container. In the subsequent molding step, therefore, the liner stock can be molded into the desired shape without the need to cause a greater portion of it to flow greatly. Since there is no need to cause a greater part of the liner stock to flow greatly during the molding step, the liner stock can be molded without orienting it radially or otherwise. This, in turn, obviates the likelihood of crack formation in the liner which is due to the radial orientation of the liner stock. Furthermore, since the molten liner stock is positioned at a certain locality in the container closure, the amount of the liner stock positioned at the center of the closure after the molding can be minimized or, if desired, reduced to zero. The amount of the liner stock required can therefore be minimized. Moreover, since the method of this invention involves extruding the liner stock in the heated and molten state, positioning it at a specified location within the container closure, and molding the liner stock into the desired shape while it is still hot and molten, the present invention does not require additional steps of molding the liner stock into a pre-formed liner of the desired shape, and of heating the pre-formed liner fed into the container closure before it is molded. Another advantage is that since there is no need to cool and heat the liner stock repeatedly, the properties of the liner stock are not degraded.

According to another aspect of the invention there is provided, for convenient use in performing the method of this invention, an apparatus for forming a liner in a container closure, said apparatus comprising a closure conveying means for conveying container closures to be lined through a predetermined passage; an extruder for extruding a liner stock in the heated and molten state in an annular shape into a closure conveyed to a liner stock feeding section by said conveying means and positioning the annular liner stock in a predetermined location in the closure, said extruder including a heater member for melting the liner stock, at least one annular extrusion opening located opposite to the closure at said liner stock feeding section and a shutoff member for closing said extrusion opening; and a molding machine for molding the liner stock in the closure into the desired shape while it is still hot and molten, said closure having been conveyed to a liner stock molding section from the liner stock feeding section by said closure conveying means.

According to still another aspect of the invention, there is provided, for convenient performance of the method of this invention, an apparatus for forming a liner in a container closure, said apparatus comprising a closure conveying means for conveying closures to be lined through a predetermined passage; an extruder for extruding the liner stock in the heated and molten state into an annular shape including a heater section for melting the liner stock and an annular extrusion opening; a liner stock conveying means for cutting off at the extrusion opening the annular liner stock extruded from the extrusion opening of said extruder, conveying the cut liner stock to a closure conveyed to a liner stock feeding section by said closure conveying means, and positioning it at a predetermined location in the closure; and a molding machine for molding the liner stock in the closure into the desired shape while it is still hot and molten, said closure having been conveyed to a liner stock molding section from the liner stock feeding section by said closure conveying means.

BRIEF DESCRIPTION OF THE DRAWINGS

FIGS. 2-a and 2-b are diagrammatic views for illustrating the outline of the operation of the apparatus shown in FIG. 1;

FIGS. 8-a, 8-b and 8-c are simplified views showing the operation of the liner stock conveying means shown in FIG. 7.

DETAILED DESCRIPTION OF PREFERRED EMBODIMENTS

The invention is described in greater detail below with reference to the accompanying drawings showing preferred embodiments of the apparatus of this invention.

Figure 1:
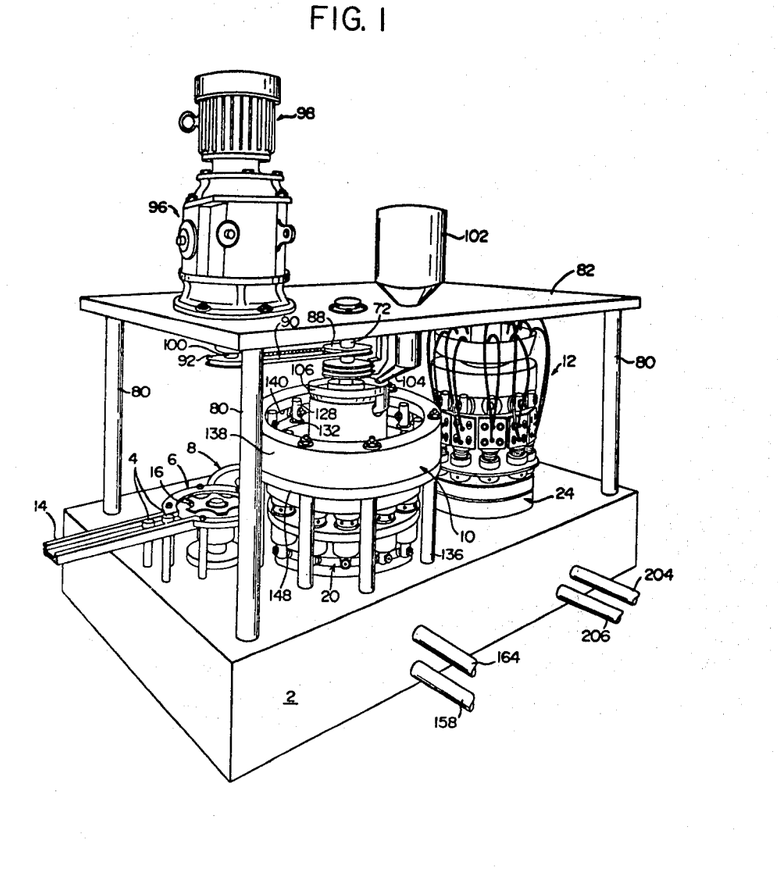
FIG. 1 is a perspective view showing one embodiment of an apparatus in accordance with this invention.

Referring to FIG. 1, the apparatus of this invention illustrated includes container closure conveying means 6 for conveying container closures 4 to be lined, a heating section 8 for heating the container closures 4, an extruder 10, and a molding machine 12 as principal constitutent elements mounted on a base stand 2.

The closure conveying means 6, and will be described below with reference to FIGS. 2-a and 2-b, conveys closures 4 continuously through a predetermined path leading from the heating section 8 to the molding machine 12 via the extruder 10. The heating section 8 heats the closures 4 to a temperature suitable for the adhesion of the molten liner stock to a predetermined position of the closures 4, for example about 200° C. The extruder 10 functions to heat a liner stock composed of a suitable thermoplastic resin such as polyolefins or vinyl chloride resins, extrude the resulting molten liner stock into an annular shape, and position the extrudate at a predetermined locality in the closure 4 heated to the suitable temperature by the heating section 8. The molding machine 12 acts on the molten liner positioned in the closure 4 and molds it into the desired shape.

Figures 2A, 2B:
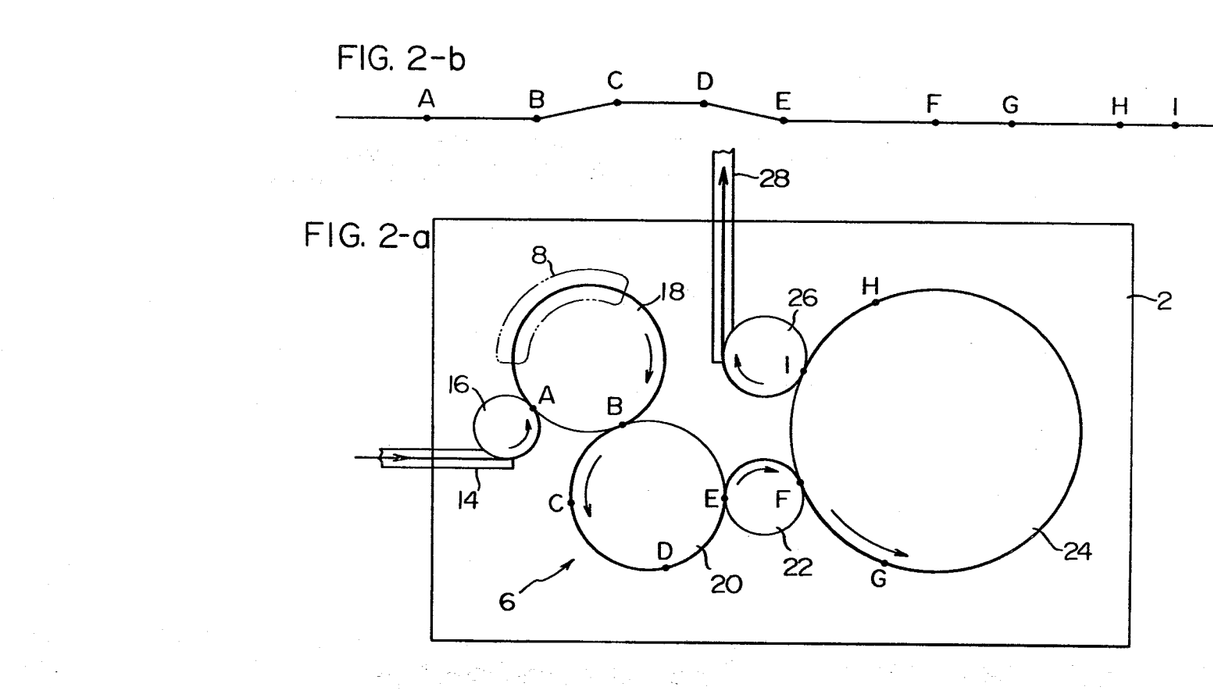

With reference to FIGS. 2-a and 2-b together with FIG. 1, the outline of the operation of the apparatus shown in FIG. 1 is described below.

A container closure 4 to be lined, in an upside-down condition, i.e. in a condition in which the inside of its top surface faces upward as shown in FIG. 1, is fed to an inlet turret 16 rotating in the direction shown by the arrow in FIG. 2-a by a feed conveyor 14. Then, at a position shown by A in FIG. 2-a, it is transferred from the inlet turret 16 to a turret 18 in the heating section. The turret 18 rotates in the direction shown by the arrow in FIG. 2-a, and conveys the closure 4 from the position A to a position shown by B in FIG. 2-a along an arcuate path through the heating section 8. The heating section 8 includes a heater (not shown) of a known type such as a high frequency induction heater so that the closure 4 passing through the heating section is heated, for example, to about 200° C. The closure 4 which has been conveyed to the position B by the turret 18 in the heating section is then transferred to a turret 20 in the liner stock feeding section which is rotating in the direction shown by the arrow in FIG. 2-a, and is conveyed from the position B to a position shown by E through positions C and D in FIG. 2-a along an arcuate path. The extruder 10 is disposed above the turret 20. As is understood from FIG. 2-b, the closure 4 conveyed by the turret 20 is gradually lifted in a perpendicular direction in a region ranging from the position B to the position C, and in the liner stock feeding section between the position C and the position D, the molten liner stock extruded in an annular form from the extruder 10 is positioned in a predetermined location in the closure 4 and is adhered there, as will be described in detail hereinbelow. In a region from the position D to the position E, the closure 4 is gradually caused to descend in the perpendicular direction, as will be appreciated from FIG. 2-b. The closure 4 which has been conveyed to the position E by the turret 20 is then transferred to a transfer turret 22 rotating in the direction shown by the arrow in FIG. 2-*a*, and conveyed from the position E to a position shown by F in FIG. 2-*a*. The closure 4 is then transferred to a turret 24 in the molding section at the position F. The turret 24 rotating in the direction shown by the arrow in FIG. 2-*a* conveys the closure 4 from the position F to a position shown by I through positions G and H in FIG. 2-*a* along an arcuate path. Above the turret 24 is disposed the molding machine 12. In the liner stock molding section between the positions G and H, the liner stock adhering to the closure 4 is molded into the desired shape. The closure 4 which has been conveyed to the position I by the turret 24 is then transferred to an outlet turret 26 rotating in the direction shown by the arrow in FIG. 2-*a*, and from there, is discharged through a discharge conveyor 28.

In the apparatus shown in FIG. 1, the various turrets 16, 18, 20, 22, 24 and 26 may be of any known types obvious to those skilled in the art, and therefore, a detailed description of these turrets is omitted in this specification. While in the apparatus shown in FIG. 1, the closure conveying means 6 is constructed of a plurality of turrets, it is apparent to those skilled in that art that if desired, the closure conveying means may be constructed of other suitable means such as a chain conveyor.

The extruder 10 will now be described in greater detail with reference to FIGS. 1, 3 and 4, especially FIG. 3.

The extruder 10 in the illustrated embodiment includes a main body 34 which, through a heat insulating section 30 containing a suitable heat insulating material, is integral with a generally annular main body portion 32 of the turret 20 of the closure conveying means 6. The main body 34 of the extruder 10 has a generally hollow cylindrical first portion 34*a* located above the turret 20 and a second portion 34*b* extending downwardly in the perpendicular direction through the center of the main body portion 32 of the turret 20. A circular recess 36 is formed in the top surface of the first portion 34*a*, and to the bottom surface of the circular recess 36 is rigidly secured through a suitable clamping means such as a clamping bolt 40 a barrel member 38 defining a heat-melting section 37 of the extruder 10, specifically a substantially hollow cylindrical barrel member 38 defining therein a space for heat-melting the liner stock.

The main body 34 (the first portion 34*a* and the second portion 34*b*) of the extruder 10, the barrel member 38 and the turret 20 integral with the main body 34 of the extruder 10, as described hereinabove, are rotatably mounted on a cylindrical support section 42 integral with the base stand 2. Specifically, an upper annular bearing 44 is disposed between the top end portion of the support 42 and the inside surface of the main body portion 32 of the turret 20, and a lower annular bearing 48 is provided between the lower end portion of the support 42 and the annular inside surface of a gear 46 secured to the lower end of the second portion 34*b* of the main body 34 of the extruder 10. By the provision of these bearings 44 and 48, the main body 34 of the extruder 10, the barrel member 38, and the turret 20 are mounted rotatably on the support section 42. The gear 46 secured to the lower end of the second portion 34*b* of the main body 34 is in mesh with an input gear 50 mounted rotatably on the base stand 2. The input gear 50 is connected to a suitable drive source (not shown) such as an electric motor mounted on the base stand 2 through a suitable transmission system (not shown). Hence, power transmitted from the drive source to the gear 46 through the input gear 50 causes the main body 34, the barrel member 38 and the turret 20 to rotate integrally in a predetermined direction at a suitable speed.

The construction of the turret 20 at the liner stock feeding section includes a turret plate 52 fixed to the aforesaid main body portion 32 and an outside guide rail 53. The turret plate 52 may be of a known type which has a plurality of nearly semicircular closure receivers spaced at equal intervals along its peripheral edge. The outside guide rail 53 may be of a known type which makes contact with the outside surface of the closure 4 and guides it so that the closure 4 transferred to a closure-receiver in the turret plate 52 at the position B in FIG. 2-*a* is turned to the position E in FIG. 2-*b* together with the turret plate 52. The turret plate 52 further includes a plurality of sliding levers 54 mounted on the main body portion 32 at positions corresponding to a plurality of the closure receivers formed along the peripheral edge of the turret plate 52. The sliding levers 54 are adapted to slide perpendicularly. To the top of each sliding lever 54 is secured a supporting disc 56 supporting the bottom of the closure 4 positioned within a closure receiver of the turret plate 52. A roller supporting lever 60 having a follower roller 58 rotatably mounted on its inside end is fixed to the vicinity of the bottom of the sliding lever 54. The follower roller 58 is engaged in an annular cam groove 64 formed on the outside surface of a cylindrical cam plate 62 secured to the base stand 2 and the cylindrical support section 42. The annular cam groove 64 has a configuration corresponding to that part of the track shown in FIG. 2-*b* which is between H and D, and causes the sliding lever 54 to ascend or descend in the perpendicular direction during the rotation of the turret 20, whereby the closure 4 placed on the supporting disc 56 is caused to descend and ascend along the track at positions B to E in FIG. 2-*b*. In FIG. 3, the sliding lever 54 on the right side is shown in its lowest position (i.e., the position at B and E in FIGS. 2-*a* and 2-*b*), and the sliding lever 54 on the left side is shown by its highest position (i.e., the position at C and D in FIGS. 2-*a* and 2-*b*).

Turning again to the construction of the extruder 10, a closing member 66 for closing the upper end of the liner stock melting space defined within the barrel member 38 is fixed to the upper end of the barrel member 38 by a suitable means (not shown) such as a bolt. An extruder screw 68 is mounted within the liner stock melting space. The extruder screw 68 has a shaft 72 extending upwardly in the perpendicular direction through a hole 70 formed centrally in the closing member 66. The shaft 72 is rotatably supported by a pair of bearings 76 and 78 disposed within a bearing portion 74 formed integrally with the closing member 66 and projecting upwardly therefrom, and a pair of bearings 84 and 86 disposed within an upper supporting stand 82 fixed in a suitable position above the base stand 2 by means of supporting posts 80 (see FIG. 1) extending upwardly from the four corners of the base stand 2. It will be appreciated therefore that the extruder screw 68 and the shaft 72 thereof are mounted so that they can rotate independently of the barrel member 38 of the extruder 10. In the vicinity of the top end of the shaft 72 is secured a pulley 88 which is drivingly connected to an input pulley 92 (see FIG. 1) by a belt 90. On the other hand, as shown in FIG. 1, a suitable power transmission mechanism 96 such as a gear box and a suitable drive source 98 such as an electric motor the rotating output shaft of which is connected to the input shaft of the power transmission mechanism 96 are disposed on the upper supporting stand 82. The input pulley 92 is secured to an output shaft 100 of the power transmission mechanism 96. Accordingly, the rotating power is transmitted from the drive source 98 to the shaft 72 of the extruder screw 68 through the input pulley 92, the belt 90 and the pulley 88, whereby the shaft 72 and the extruder screw 68 are rotated at a suitable speed in a predetermined direction. The rotating direction of the main body 34 and the barrel member 38 of the extruder 10 may be the same as that of the extruder screw 68, but preferably, these rotating directions are opposite to each other. If these rotating directions are opposite to each other, the relative rotating speed of the extruder screw 68 to the barrel member 38 is increased by an amount corresponding to the rotating speed of the barrel member 38, and therefore, the rotation of the barrel member 38 can be additionally utilized in the heat-melting of the liner stock by the extruder screw 68.

The upper supporting stand 82 further has a hopper 102 (see FIG. 1) secured thereto for holding pelletized liner stock which may be made of a suitable thermoplastic resin such as a polyolefin or vinyl chloride polymer. Above the barrel member 38 of the extruder 10 is disposed a receptacle 106 for receiving the pellets discharged from a discharge opening 104 of the hopper 102. A discharge passage 108 of this receptacle 106 communicates with the liner stock melting space defined within the barrel member 38 through a passage 110 formed in the barrel member 38. It will be appreciated therefore that the pellets stored in the hopper 102 are fed into the liner stock melting space through receptacle 106 and the passage 110, and there, by the action of the rotating extruder screw 68, are heat-melted and sent downwardly.

The main body 32 of the extruder 10 has disposed therein a plurality of extrusion openings 112 aligned at positions corresponding to the closure receivers formed along the peripheral edge of the turret plate 52 of the turret 20, i.e. at positions matching the closure receivers in the perpendicular direction. It is important that such an extrusion opening 112 should have an annular shape with a size corresponding to the size of a closure 4 to be lined. Referring to FIG. 4 which is an enlarged sectional view of the extrusion opening 112 and vicinity together with FIG. 3, each of the annular extrusion openings 112 is defined by the lower end of an outside cylindrical member 114 fixed by a suitable means to the lower surface of the outside portion of the first portion 34a of the main body 34 of the extruder 10 and the lower end of a substantially circular-cylindrical member 118 disposed concentrically within the member 114 by a suitable means such as a bolt 116. The outside diameter of the lower part of the member 114, as is clearly illustrated in FIG. 4, is preferably substantially equal to, or slightly smaller than, the inside diameter of the closure 4 to be lined. Each of the annular extrusion openings 112 communicates with each of passages 122 through an annular extrusion passage 120 formed between the members 114 and 118. The passages 122 are disposed in a circumferentially spaced relationship in the first portion 32a of the main body 32 of the extruder 10 and extend in the perpendicular direction. The perpendicular passage 122 communicates with a plurality of radial passage 124 extending radially from the lower end of the liner stock melting space having the extruder screw 68 disposed therein. It will be readily appreciated therefore that by the action of the rotating extruder screw 68, the heat-melted liner stock discharged from the liner stock melting space reaches the extrusion openings 112 through the radial passages 124, the perpendicular passage 122 and the annular extrusion passage 120, and is extruded from the extrusion openings 112.

The extruder 10 is further provided with shutoff members 126 for selectively changing the individual extrusion openings 112 between a closed or opened condition. In the embodiment shown in the drawings, the shutoff member 126 is constructed of a valve rod member 128 disposed slidably in the perpendicular direction within the perpendicular passage 122 formed in the first portion 32a of the main body 32 of the extruder 10. The lower end of the valve rod member 128 has an annular valve 130, fixed thereto or formed integrally therewith, capable of sliding in the perpendicular direction in the annular passage 120. The valve 130 in its lowest position, i.e., the closed position, comes into engagement with the inside end of the extrusion opening 112 and closes the extrusion opening 112 from inside, and when it rises from the closed position and reaches an open position, moves away from the inside end of the extrusion opening 112 and returns the extrusion opening 112 to the normally open state. The upper end of the valve rod member 128 projects beyond the first portion 34a of the main body 34 of the extruder 10, and to the neighborhood of its upper end is secured a roller supporting lever 134 to the outside end of which is rotatably secured a follower roller 132. On the other hand, a plurality of erect support posts 136 (see FIG. 1) are fixed to the base stand 2 at spaced intervals in the circumferential direction, and an annular cam plate 138 is mounted on the upper end portion of each of these erect support posts 136. An annular cam groove 140 is formed in the inside surface of the annular cam plate 138 in which the follower roller 132 is engaged. The annular cam groove 140 causes the valve rod member 128 and the valve 130 provided at its lower end to ascend or descend in the preperpendicular direction when the main body 34 and the barrel member 38 of the extruder 10 are rotated together with the turret 20, thereby changing the extrusion opening 112 between the open and closed state. More specifically, the main body 34 and the barrel member 38 of the extruder 10 are rotated together with the turret 20 to bring the extrusion opening 112 and the closure 4 located there beneath to the position C in FIG. 2-a and 2-b (at which position the closure 4 is lifted by the action of the sliding lever 54, and reaches the state shown on the left side of FIG. 3). Simultaneously with, or a little after, this time, the annular cam groove 140 and the follower roller 132 cooperate to lift the valve rod member 128 and the valve 130 provided at its lower end, thereby opening the extrusion opening 112. As soon as, or a little before, the extrusion opening 112 and the closure 4 located beneath it reach the positions D shown in FIGS. 2-a and 2-b, the annular cam groove 140 and the follower roller 132 cooperate to cause the valve rod member 128 and the valve 130 provided at its lower end to descend, thereby closing the extrusion opening 112. It will be readily appreciated therefore that when the closure 4 is conveyed from the position C shown in FIGS. 2-a and 2-b to the position D by the action of the turret 20, the heat-melted liner stock is extruded in an annular shape from the extrusion opening 112, and the annular liner stock is positioned in and adhered to a predetermined location within the closure 4.

The illustrated embodiment further includes a so-called mechanical seal means 142 for sealing the upper end portion of the perpendicular passage 122 and thereby preventing the leakage of the molten liner stock from the upper end portion of the perpendicular passage 122. The mechanical seal means 142 is constructed of a seal member 144 rotatably mounted around the valve rod member 128 in the upper end portion of the perpendicular passage 122. The seal member 144 has a mechanical sealing screw thread formed on its inside surface for engagement with the surface of the valve rod member 128, and a second mechanical sealing screw thread formed on its outside surface for engagement with the inside surface of the perpendicular passage 122. A gear 146 is formed integrally with, or rigidly secured to, the upper end portion of the seal member 144. On the other hand, immediately below the annular cam plate 138, an annular gear 148 having teeth formed on its inside surface is secured to the erect support post 136 for engagement with the gear 146 provided in the seal member 144. It will be appreciated that in the structure described hereinabove, when the main body 34 of the extruder 10 rotates, the seal member 144 rotates about the central axial liner of rotation of the main body 34 and also revolves about its own central axial line because of the gear 146 of the seal member 144 is in engagement with the fixed annular gear 148, and that by this revolution about its own axial line, the top end portion of the perpendicular passage 122 can be effectively sealed mechanically.

The extruder 10 in the illustrated embodiment further includes various means known per se for controlling the temperature and pressure of the liner stock to be heat-melted in the liner stock melting space defined within the barrel member 38 and the molten liner stock passing through the radial passages 124. These means are briefly described below with reference to FIG. 3. An electric heater 150 is provided in the barrel member 38. The barrel member 38 also includes a temperature detectors 152 for detecting the temperatures of the barrel member 38 at various positions in order to properly control power supply to the electric heater 150. An electric heater 154 is provided above the radial passages 124 of the first portion 34a of the main body 34 of the extruder 10. On the other hand, a heat transfer medium circulating chamber 156 is provided below the radial passages 124 of the first portion 34a of the main body 34 of the extruder 10. A suitable heat transfer medium such as water or air is circulated in the circulating chamber 156. The heat transfer medium is introduced from the suitable supply source (not shown) into the circulating chamber 156 through a supply conduit 158 and a flow passage 160 provided within the second portion 34b of the main body 34, and is discharged through a flowout passage 162 and a discharge conduit 164 disposed within the second portion 34b of the main body 34. The circulating chamber 156 includes an electric heater 166. An electric heater 167 is provided at that position of the first portion 34a of the main body 34 which adjoins the perpendicular passage 122. The circulating chamber 156 also includes a temperature detector 168 for detecting the temperature in the circulating chamber 156 in order to control power supply to the electric heater 166, 167 and 154. The first portion 34a of the main body 34 of the extruder 10 and the barrel member 38 have provided therein a relief passage 170 which extends upwardly in the perpendicular direction from the radial passages 125 and further extends radially inwardly to cause the radial passages 124 to communicate with the neighborhood of the upper end portion of the liner melting space. The relief passage 170 includes a relief valve 172 provided for example at the radially extending part, and a pressure detector 174 in the perpendicularly extending part for detecting the pressure of the heat-melted liner stock. When the pressure of the heat-melted liner stock in the radial passages 124 exceeds a certain limit, the pressure detector 174 detects it and opens the relief valve 172, thereby returning the heat-melted liner stock in the radial passages 124 to the upper end portion of the liner melting space through the relief passage 170. When the pressure of the molten liner stock in the radial passages 124 is below the upper limit specified, the relief valve 172 is closed to shut off the relief passage 170. The aforesaid electric heaters 150, 154, 166 and 167 and a solenoid (not shown) attached to the relief valve 172 to close the relief valve 172 are connected to a suitable power supply source (not shown) through a suitable wiring means (not shown) provided in the extruder 10 and a slip ring mechanism 176 provided at the upper portion of the extruder 10. The slip ring mechanism 176 is made up of a generally substantially cylindrical member 180 fixed by suitable means such as a bolt 178 to the upper end of bearing means 74 of the closing member 66 secured to the upper end of the barrel member 38, and member 184 fixed to the undersurface of the support stand 82 by a suitable means such as a bolt 182 and cooperating with the member 180. On the other hand, the temperature detectors 152 and 168 and the pressure detector 174 are connected through a suitable wiring means (not shown) disposed within the extruder 10 and a slip ring 186 provided at the lower end of the extruder 10 to a suitable control circuit (not shown) for controlling the supply of power to the aforesaid electric heaters 150, 154 and 166 and solenoid. The slip ring mechanism 186 is constructed of a generally substantially cylindrical member 188 fixed to the lower end portion of the second portion 34b of the main body 34 of the extruder 10 and a member 190 fixed to a part of the base stand 2 and cooperating with the member 188.

The molding machine 12 will be described below in detail with reference to FIGS. 1, 5 and 6.

The molding machine 12 may be of any suitable type which can mold the liner stock positioned at a predetermined locality within the closure 4 by the extruder 10 into the desired shape while it is still in the heatmelted state. The basic constituent elements of the molding machine 12 may be substantially the same as those of known molding machines. The molding machine shown in FIGS. 1, 5 and 6 is conveniently used in this invention.

In the illustrated embodiment, the molding machine 12 is mounted above the turret 24 of the molding section of the closure conveying means so that it can rotate together with the turret 24, as in the case of the relation between the extruder 10 and the turret 20 of the closure conveying means 6, although no details of the mounting mechanism are shown in the drawing.

Figure 5:
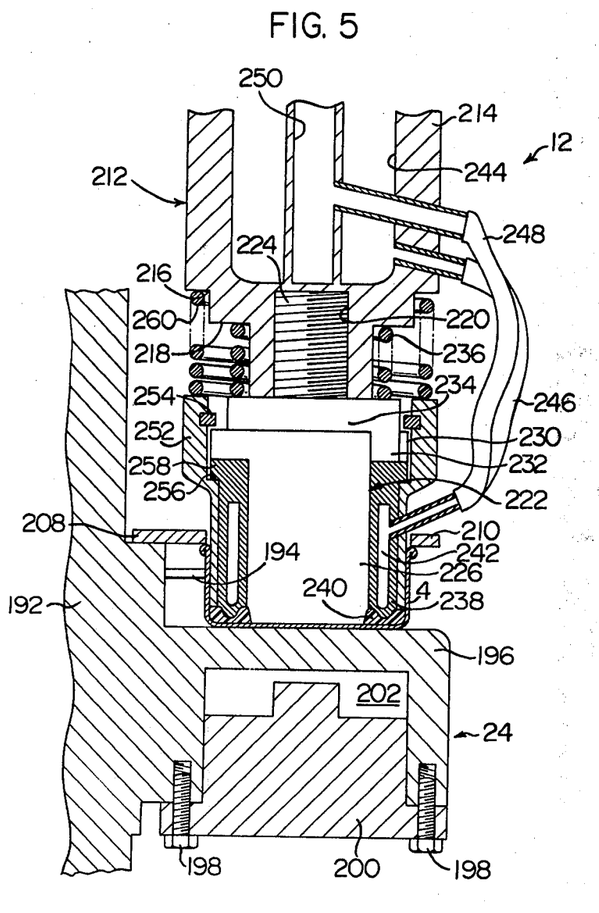
FIG. 5 is a sectional view showing a part of a molding machine used in the apparatus shown in FIG. 1.
Figure 6:
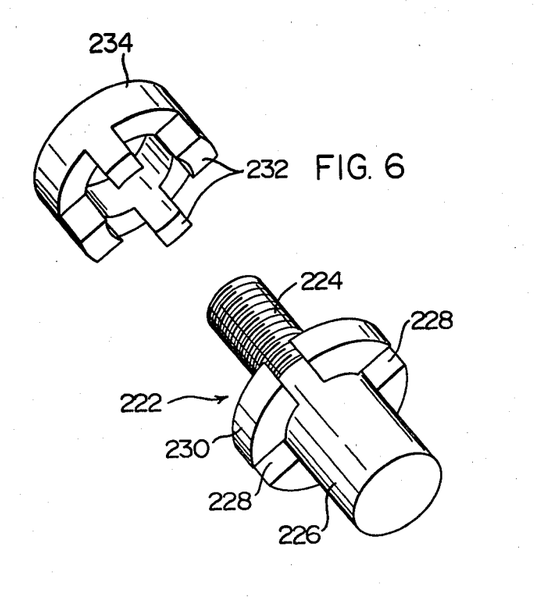
FIG. 6 is an exploded perspective view showing some of the component parts of the molding machine shown in FIG. 5.

The turret 24 of the closure conveying means 6 in the molding section is rotatably mounted on the base stand 2 as in the case of the main body portion 32 of the turret 20 in the stock feeding section, and includes a main body portion 192 (only a part of the peripheral edge thereof is shown in FIG. 5) adapted to be driven at a suitable speed in a predetermined direction by a suitable drive source (not shown) such as an electric motor through a suitable power transmission mechanism (not shown). To the main body portion 192 is secured a turret plate 194, similar to the turret plate 52 in the turret 20, which is a known annular turret plate having a plurality of substantially semicircular closure receivers spaced at equal intervals along the peripheral edge. On the other hand, as shown in FIG. 5, the main body 192 has integrally formed thereon an annular projection 196 extending substantially horizontally beneath the turret plate 194 and further extending downwardly in the perpendicular direction. To the bottom of such an annular projection 196 is fixed an annular member 200 by a suitable means such as bolts 198, and a circulating space 202 through which a cooling medium, preferably water, is circulated is defined between the undersurface of the annular projection 196 and the annular member 200. The cooling medium is fed from a supply conduit 204 (see FIG. 1) to the circulating space 202 through an inlet passage (not shown) disposed within the main body 192, and is discharged from a discharge passage (not shown) disposed within the main body 192 through a discharge conduit 206 (see FIG. 1). Furthermore, an annular inside stripper member 208 and an annular outside stripper member 210 are secured to the main body portion 192 spaced at a position above the top surface of the horizontal portion of the annular projection 196 a predetermined distance (slightly larger than the height of the closure). As will be described specifically hereinbelow, these stripper members 208 and 210 come into engagement with the upper end of the closure 4 to prevent the closure 4 from rising together with a molding device (to be described hereinbelow) of the molding machine 12 when the molding device is caused to descend in the perpendicular direction and molds the liner stock in the closure 4 placed in a closure receiver of the turret plate and supported on the horizontal portion of the annular projection 196.

The molding machine 12 cooperating with the turret 24 in the molding section as described above has a plurality of molding devices 212 (FIG. 5 shows a part of one such device) provided above the closure receivers of the turret plate 194 and corresponding to these receivers. Referring to FIG. 5, each of the molding devices has a sliding member 214 which is mounted slidably in the perpendicular direction on the main body portion 192 of the turret 24 or on a suitable member secured to the main body portion 192. The sliding member 214 has provided at its lower portion two annular shoulder portions 216 and 218 facing downward in the perpendicular direction and a central threaded hole 220. The upper end portion of a central member 222 is screwed into the central hole 220 of the sliding member 214. As shown in FIG. 6, the central member 222 includes an upper portion 224 having the outside surface threaded for screwing into the central hole 220, a circular-cylindrical lower portion 226 having a predetermined outside diameter, and a flange 230 having a plurality of recesses 228 and positioned between the upper portion 224 and the lower portion 226 and spaced from each other in the circumferential direction. Furthermore, as shown in FIG. 6, around the lower end portion of the sliding member 214 is slidably fitted an annular member 234 having a plurality of projections 232 projecting downwardly in the perpendicular direction. The projections 232 of the annular member 234 are positioned so that they respectively match the plurality of recesses 228 formed in the flange portion 230 of the central member 222. Between the shoulder portion 218 of the sliding member 214 and the upper end surface of the annular member 234 is disposed a spring 236 which elastically urges the annular member 234 downwardly in the perpendicular direction. By the urging action of the spring 236, the annular member 234 is urged against the top surface of the flange portion 230 of the central member 222, and the individual projections 232 project downwardly beyond the undersurface of the flange portion 230 through the recesses 228. Around the circular cylindrical lower portion 226 of the central member 222 is fitted a molding tool 238 in a manner such that it can freely slide with respect to the lower portion 226. The projections 232 of the annular member 234, which project downwardly through the recesses 228 formed in the flange portion 230 of the central member 222, abut the top end surface of the molding tool 238. Accordingly, the urging force of the spring 236 is exerted on the molding tool 238 through the annular member 234, and the molding tool 238 is urged elastically downwardly in the perpendicular direction. The lower end surface of the molding tool 238 to be engaged with the heat-melted liner stock 240 positioned at a predetermined locality in the closure 4 by the extruder 10 as described hereinabove is shaped corresponding to the desired shape of the liner to be finally formed in the closure 4. Preferably, the molding tool 238 has formed therein an annular circulating space 242 through which a cooling medium, preferably water, is to be circulated. The cooling medium is introduced from a suitable supply conduit (for example, it may be the supply conduit 204 shown in FIG. 1) into the circulating space 242 through an inlet passage 244 formed in the sliding member 214 and inlet conduit 246 communicating with the inlet passage 244, and is discharged from a suitable discharge conduit (for example, it may be the discharge conduit 206 shown in FIG. 1) through a discharge conduit 248 and a discharge passage 250 formed in the sliding member 214. A generally substantially cylindrical sleeve 252 is slidably fitted exteriorly of the molding tool 238 and the flange portion 230 of the central member 222. It is essential that the outside diameter of the lower portion of the sleeve 252 should be substantially equal to, or slightly smaller than, the inside diameter of the closure 4. To the inside surface of the sleeve 252 in the vicinity of its upper end is secured a stop ring 254 which abuts the upper surface of the flange portion 230 of the central member 222 to restrict the down-ward movement of the sleeve 252 with respect to the central member 222. An annular shoulder portion 256 is formed on the inside of the sleeve 252 at its middle portion. The shoulder portion 256 comes into engagement with the undersurface of the annular flange 258 formed at the upper end portion of the molding tool 238 to restrict the downward movement of the molding tool 238 with respect to the sleeve 252. Between the upper end surface of the sleeve 252 and the shoulder portion 216 of the sliding member 214 is disposed a spring 260 which elastically urges the sleeve 252 downwardly in the perpendicular direction so that the stop ring 254 fixed to the sleeve 252 abuts the top surface of the flange portion 230 of the central member 222.

Although not shown in the drawings, the molding device 212 further includes a suitable lift mechanism which moves the sliding member 214 of the molding device 212 the central member 222, annular member 234 and molding tool 238 amounted on the molding device 212, and the sleeve 252 upwardly and downwardly in the perpendicular direction as prescribed, when the turret 24 in the molding section rotates and the molding device 212 is rotated about the central axial line of the turret 24. The lift mechanism may be a mechanism similar to a mechanism composed of the annular cam groove 140 and the cooperating follower roller 132 for moving the shutoff device 126 of the extruder 10 upwardly and downwardly, and therefore, it may be a mechanism constructed of an annular cam groove fixed to the base stand 2 and a follower roller mounted on the upper end portion of the sliding member 214 and cooperating with the annular cam groove upon engagement therewith. Such a lift mechanism gradually causes the molding device 212 to descend to the descended position shown in FIG. 5 from the lifted position at which the lower end of the lower portion 226 of the central member 222, the lower end of the molding tool 238 and the lower end of the sleeve 252 are somewhat above the stripper members 208 and 210 of the turret 24 in the molding section, while the molding device 212, incident to the rotation of the turret 24, moves from the position F in FIG. 2-a to the position G in FIG. 2-a. While the molding device 212 moves from the position G to the position H shown in FIG. 2-a, the lift mechanism holds the molding device 212 in the aforesaid lowered position. Then, while the molding device 212 moves from the position H to the position I shown in FIG. 2-a, the lift mechanism gradually lifts the molding device 212 from the aforesaid lowered position to the raised position. Thereafter the lift mechanism holds the molding device 212 at the raised position while the molding device 212 moves from the position I to the position F shown in FIG. 2-a.

When the molding device 212 has been caused to descend to the lowered position, the lower portion 226 of the central member 222, the molding tool 238 and the sleeve 252 are placed in the closure 4 as shown in FIG. 5. The lower end surface of the lower portion 226 of the central member 222 comes into engagement with the central part of the central panel portion of the closure 4, and the lower end surface of the molding tool 238 and the lower end surface of the sleeve 252 are urged by the action of the springs 236 and 260 and come into engagement with the annular liner stock 240, thus molding it into the desired shape. It will be appreciated therefore that while the closure 4 having the annular liner stock 240 positioned at a predetermined locality thereof by the action of the extruder 10 is conveyed by the turret 24 in the molding section from the position F to the position H shown in FIG. 2-a, the heat-melted liner stock is molded as required by the action of the molding device 212 of the molding machine 12, and during this molding, the molded liner is cooled by the cooling media circulating through the circulating space 202 of the turret 24 and the circulating space 242 of the molding tool 238.

The shapes of the lower end surface of the molding tool 238 and the lower end surface of the sleeve 252, which shape of the liner to be formed, may be any desired shape corresponding to the opening end (not shown) of a container such as a bottle or can to which the closure 4 is to be applied. In the illustrated embodiment, the entire undersurface of the circular-cylindrical lower portion 226 of the central member 222 comes into engagement with the central part of the central panel portion of the closure and therefore, the liner stock does not flow at all to the central part of the central panel portion. If desired, however, some of the liner stock may be permitted to flow to the central part of the central panel portion of the closure at the time of molding.

Figure 3:
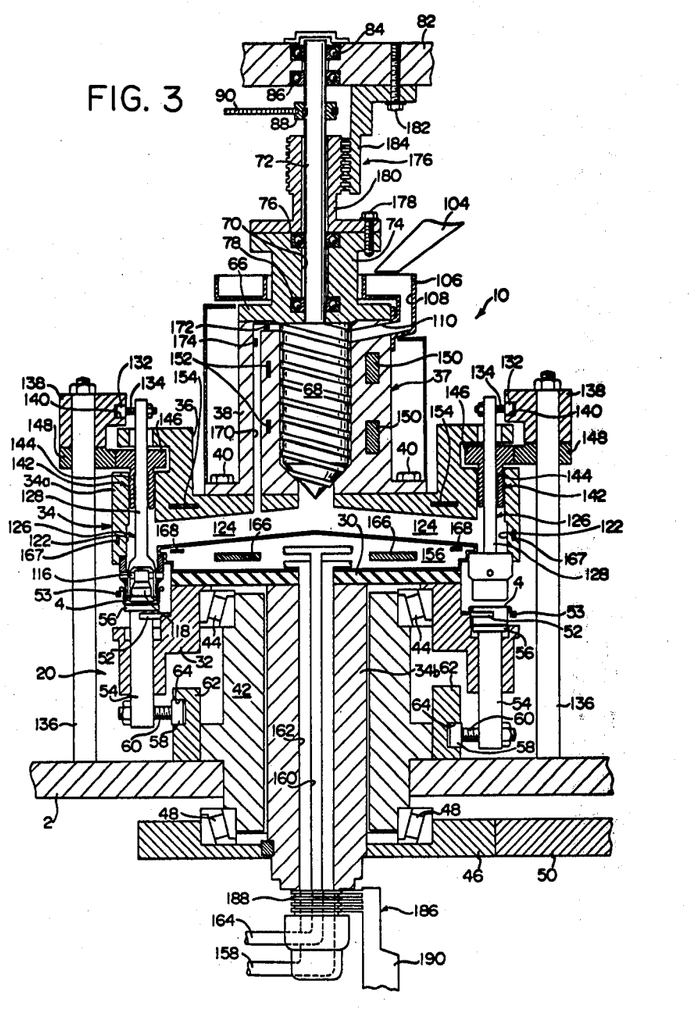
FIG. 3 is a sectional view showing an extruder used in the apparatus shown in FIG. 1.
Figure 4:
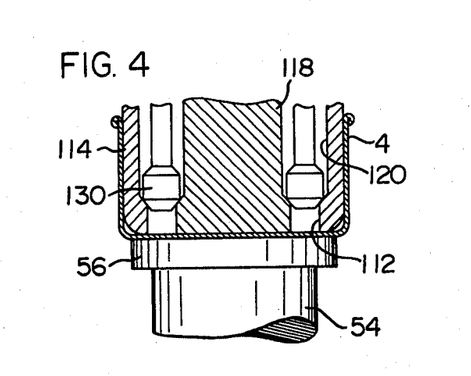
FIG. 4 is an enlarged sectional view showing the details of the extrusion opening, and the adajcent portion, of the extruder shown in FIG. 3.
Figure 7:
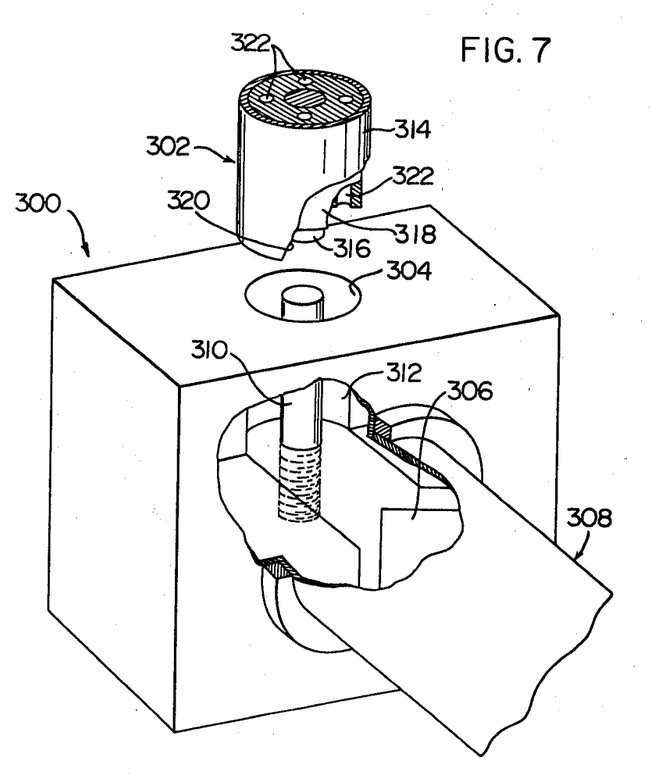
FIG. 7 is a perspective view, partly broken away, showing an extruder and a liner stock conveying means which can be used instead of the extruder shown in FIGS. 3 and 4.
Figure 8A:
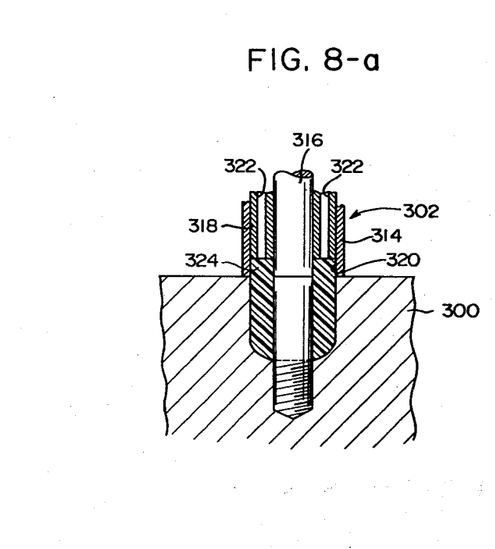
Figure 8B:
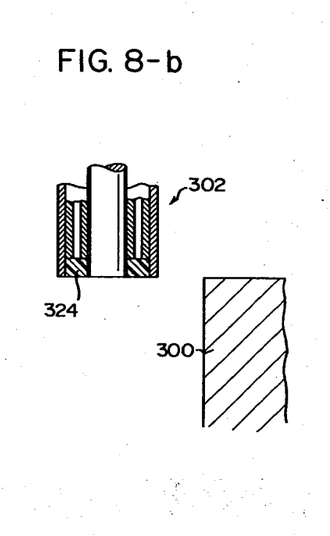
Figure 8C:
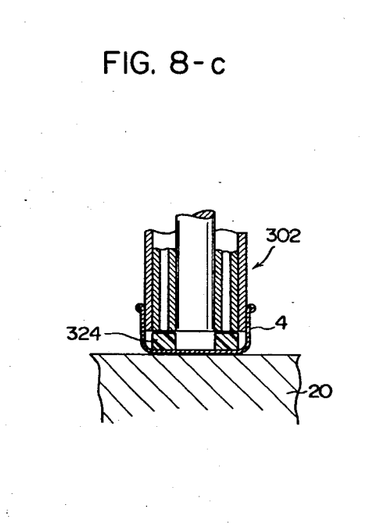

FIGS. 7 and 8-a to 8-c show an extruder 300 for extruding a molten liner stock in annular form and a liner stock conveying means 302 for conveying the liner stock extruded from the extruder 300 to a closure and positioning it at a predetermined locality in the closure, which can be used instead of the extruder 10 illustrated in FIGS. 3 and 4.

The extruder 10 illustrated in FIG. 3 and 4, as described hereinabove, extrudes the molten liner stock in annular form, and positions it directly at a predetermined locality in the closure 4. In contrast, the extruder shown in FIG. 7 only extrudes the molten liner stock in annular form, and the liner stock extruder from the extruder 300 is conveyed to the inside of the closure 4 by the liner stock conveying means 302 and positioned at a predetermined location.

Referring to FIG. 7, the extruder 300 will first be described. The extruder 300 disposed, for example, at a site spaced from the turret 20 in the stock feeding section of the closure conveying mechanism 6 of the apparatus shown in FIG. 1 is of substantially the same structure as an ordinary extruder except that an extrusion opening 304 preferably directed upwardly in the perpendicular direction has an annular shape. The extruder 300 includes therein an extruder screw 306 (only a part of the tip portion is shown in FIG. 7), a heat-melting section 308 and an extrusion opening 304 for extruding the molten liner stock from the heat-melting section 308. The extrusion opening 304 is located at an exit end of an extrusion passage 312 having an annular cross section and defined by a hole having a circular cross section and a circular-cylindrical core 310 extending coaxially with, and centrally of, the hole, and has the same annular cross sectional shape as the extrusion passage 312.

The liner stock conveying means 302 will now be described. The liner stock conveying means 302 may be of any suitable type which can cut off the molten liner stock extruded from the extrusion opening 304 of the extruder 300 from the extrusion opening 304, convey it to the inside of the closure 4 (see FIG. 8-c), and position it at a predetermined location in the closure 4. Preferably, however, it has the structure shown in FIG. 7. Referring to FIG. 7 and FIG. 8-a, the liner stock conveying means 302 includes a cylindrical outside member 314 disposed concoaxially, a circular-cylindrical central member 316, and disposed between these an annular intermediate member 318 (FIG. 7 and FIG. 8-a to 8-c show only the lower end portion of these members), the three members being provided coaxially. These three members, as will be described in detail hereinbelow are moved integrally by a suitable transfer means (not shown), and the intermediate member 318 is caused to ascend and descend in the perpendicular direction with respect to the outside member 314 and the central member 316 by a suitable actuating means (not shown). In a normal condition, the lower end of the outside member 314 and the lower end of the central member 316 are located on the same plane, but the lower end of the intermediate member 318 is retracted upwardly a predetermined distance from said plane. Hence, at the lower end portions of the members 314, 316 and 318, there is formed an annular liner stock accommodation recess 320 the side wall of which is defined by the inside surface of the outside member 314 and the outside surface of the central member 316 and the bottom surface of which is defined by the lower end surface of the intermediate member 318. It is important that the liner stock accommodating recess 320 should have a shape corresponding to the extrusion opening 304 of the extruding 300. The intermediate member 318 has formed therein one or a plurality (four in the drawing) of holes 322 which communicate with a suitable vacuum supplying means (not shown) through a control valve (not shown).

Now, referring to FIGS. 8-a to 8-c, the operation of the liner stock conveying means 302 described above will be explained. After or before the liner stock is extruded from the extrusion opening 304 of the extruder 300, the liner stock conveying means 302 with the liner stock accommodating recess 320 therein is caused to descend in the perpendicular direction until its position matches the extrusion opening 304 of the extruder 300, and is caused to abut the extrusion opening 304. Hence, the liner stock accommodating recess 320 is put over the annular liner stock 324 extruded from the extrusion opening 304. Then, vacuum is supplied to the liner stock accommodating recess 320 via the holes 322 from the vacuum supplying means (not shown). Simultaneously, as shown in FIG. 8-b, the liner stock conveying means 302 is moved laterally of the extrusion opening 304. Thus, the liner stock 324 extruded from the extrusion opening 304 is cut off the liner stock present in the extrusion passage 312 by the shearing action of the inside lower edge of the outside member 314 and the outside lower edge of the central member 316, and is moved together with the liner stock conveying means 302. At this time, by the action of the vacuum supplied to the recess 320, the cut-off liner stock 324 is held in the recess 320. Then, the liner stock conveying means 302 having the liner stock 324 stored therein is moved to a position above the closure 4 which is being conveyed by the turret 20 in the stock feeding section of the closure conveying means 6, and is moved synchronously with the closure 4 along the moving path of the closure 4, and simultaneously caused to descend a predetermined distance in the perpendicular direction. Thus, the liner stock conveying means 302 is inserted in the closure 4 as shown in FIG. 8-c, and the lower end of the outside member 314 and the lower end of the central member 316 are brought to a position above the central panel portion of the closure 4 through a distance substantially equal to, or slightly larger than, the depth of the recess 320, i.e. the thickness of the liner stock accommodated therein. Then, the supply of vacuum to the liner stock accommodating recess 320 is stopped and the recess 320 is caused to communicate with the outer atmosphere via the holes 322. Simultaneously, the intermediate member 318 is caused to descend with respect to the outside member 314 and the central member 316 so that its lower end is located on the same plane as the lower ends of the central member 316 and the outside member 314. As a result, the liner stock 324 stored in the recess 320 is discharged, and transferred to the inside of the closure 4, whereby the annular molten liner stock 324 is positioned at a predetermined location in the closure 4.

After the liner stock 324 has been positioned at a predetermined location in the closure 4, the intermediate member 318 is lifted to the original position, and the outside member 314, the central member 316 and the intermediate member 318 are lifted integrally, and further returned to a position above the extrusion opening 304 of the extruder 300. Then, the above operation is repeated.

On the other hand, the closure in which the molten liner stock has been positioned in a predetermined location is conveyed to the molding section by the closure conveying means 6, and the liner stock 324 is molded into the desired shape by the action of a suitable molding machine, such as molding machine 12 described hereinabove, while it is in the molten state.

What we claim is:

1. An apparatus for forming a liner in a container closure, said apparatus comprising: a container closure conveying means for conveying closures to be lined along a predetermined path including a liner stock feeding section and a liner stock molding section further along said path from said liner stock feeding section, said conveying means including means for continuously conveying the closure along a substantially arcuate path in the liner stock feeding section; an extruder at said liner stock feeding section for extruding a liner stock in the heated and molten state and having an annular shape into a container closure conveyed to the liner stock feeding section by said conveying means and positioning the annular liner stock in a predetermined location in the closure, said extruder including a heating means for melting the liner stock, a plurality of downwardly open annular extrusion openings arranged above the arcuate path and opening axially of the annular shape thereof, a plurality of shutoff members for changing the respective extrusion openings between a closed and an open condition, a barrel member having therein a space for heat-melting the liner stock, said barrel member being connected with said extrusion openings and said shutoff members, and means for turning said barrel member, said extrusion openings and said shutoff members continuously and synchronously with the movement of the closures being conveyed along the arcuate path with each of the extrusion openings conveyed along the arcuate path at a position directly above the closures; said heating means including an extruder screw in said space in said barrel member and means for rotating said extruder screw in a directon opposite to the direction of rotation of said barrel member; and a molding machine at said liner stock molding section for molding the liner stock in the closure conveyed to the liner stock molding section from the liner stock feeding section by said closure conveying means into the desired shape while it is still molten.

2. The apparatus as claimed in claim 1 in which each of said annular extrusion openings has an outside diameter only slightly less than the inside diameter of the closure, whereby the greater part of the extruded liner material is positioned adjacent the peripheral edge of the closure and the liner material flows only a short distance during molding.

3. The apparatus as claimed in claim 1 in which said conveying means comprises means for raising the closure perpendicularly when the closure enters the arcuate path and is matched with one of the extrusion openings of said extruder until the inside surface of the closure is caused to contact or approach the lower end of the extrusion opening, and for lowering the closure perpendicularly as it leaves said arcuate passage, and said extruder includes means for moving the shutoff member to open said extrusion opening and thereafter to close said extrusion opening while the closure is raised, whereby the annular liner stock is extruded from said extrusion opening and pushed against a predetermined part of the inside of the closure.

* * * * *